US012749406B2

(12) United States Patent
Arai et al.

(10) Patent No.: US 12,749,406 B2
(45) Date of Patent: Sep. 29, 2026

(54) CONVOY MANAGEMENT DEVICE AND CONVOY MANAGEMENT METHOD

(71) Applicant: Mitsubishi Electric Corporation, Tokyo (JP)

(72) Inventors: Miki Arai, Tokyo (JP); Takayasu Hashimoto, Tokyo (JP); Misato Watanabe, Tokyo (JP); Dongsuk Park, Tokyo (JP); Yuri Kubota, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 18/985,166

(22) Filed: Dec. 18, 2024

(65) Prior Publication Data

US 2025/0118208 A1 Apr. 10, 2025

Related U.S. Application Data

(63) Continuation of application No. PCT/JP2022/025214, filed on Jun. 24, 2022.

(51) Int. Cl.
*G05D 1/695* (2024.01)
*G08G 1/00* (2006.01)
*G05D 105/22* (2024.01)

(52) U.S. Cl.
CPC ............... *G08G 1/22* (2013.01); *G05D 1/695* (2024.01); *G05D 2105/24* (2024.01)

(58) Field of Classification Search
CPC ....... G08G 1/22; G05D 1/695; G05D 2105/24
See application file for complete search history.

(56) References Cited

U.S. PATENT DOCUMENTS

2016/0267796 A1* 9/2016 Hiroma ................. B60W 50/14
2017/0293296 A1* 10/2017 Stenneth .......... G06Q 10/06315
2019/0122563 A1 4/2019 Wahl et al.
(Continued)

FOREIGN PATENT DOCUMENTS

JP 2009-126358 A 6/2009
JP 2019-091424 A 6/2019
(Continued)

OTHER PUBLICATIONS

Hashimoto, N., et al., "Evaluation of control in a convoy scenario," 2011 IEEE Intelligent Vehicles Symposium (IV), Baden-Baden, Germany, 2011, pp. 350-355 (Year: 2011).*
(Continued)

*Primary Examiner* — Shannon S Campbell
*Assistant Examiner* — Wayne S. Murray
(74) *Attorney, Agent, or Firm* — XSENSUS LLP

(57) ABSTRACT

A vehicle sensing unit to sense a plurality of convoy-management-target vehicles; an occupant state sensing unit to sense states of occupants riding the plurality of convoy-management-target vehicles sensed by the vehicle sensing unit; a convoy computing unit to compute a convoy of the plurality of convoy-management-target vehicles sensed by the vehicle sensing unit on the basis of a result of the sensing by the occupant state sensing unit; and a convoy control unit to control the convoy of the plurality of convoy-management-target vehicles sensed by the vehicle sensing unit on the basis of a result of the computation by the convoy computing unit are included.

18 Claims, 7 Drawing Sheets

(56) References Cited

U.S. PATENT DOCUMENTS

| | | | |
|---|---|---|---|
| 2019/0373419 | A1* | 12/2019 | Bayley ..................... G08G 1/22 |
| 2020/0183420 | A1* | 6/2020 | Kim ..................... G05D 1/0088 |
| 2020/0369269 | A1* | 11/2020 | Tanaka ............. G08G 1/096725 |
| 2021/0041893 | A1 | 2/2021 | Matsumoto et al. |
| 2021/0199462 | A1 | 7/2021 | Namba et al. |
| 2021/0200241 | A1 | 7/2021 | Oyama et al. |
| 2021/0201662 | A1 | 7/2021 | Oyama et al. |
| 2021/0201668 | A1 | 7/2021 | Oyama et al. |
| 2021/0201674 | A1 | 7/2021 | Oyama et al. |
| 2021/0201677 | A1 | 7/2021 | Oyama et al. |
| 2021/0201679 | A1 | 7/2021 | Kuwahara |
| 2021/0201682 | A1 | 7/2021 | Oyama et al. |
| 2021/0201684 | A1 | 7/2021 | Oyama et al. |
| 2021/0204188 | A1 | 7/2021 | Oyama et al. |
| 2022/0011781 | A1* | 1/2022 | Woo ..................... G05D 1/0293 |
| 2022/0063621 | A1* | 3/2022 | Austin ................. G06V 20/584 |
| 2022/0221869 | A1 | 7/2022 | Matsumoto |
| 2023/0069005 | A1 | 3/2023 | Oyanagi et al. |

FOREIGN PATENT DOCUMENTS

| | | | |
|---|---|---|---|
| JP | 2019-131147 | A | 8/2019 |
| JP | 2020-091740 | A | 6/2020 |
| JP | 2020-177328 | A | 10/2020 |
| JP | 2021-028748 | A | 2/2021 |
| JP | 2021-111341 | A | 8/2021 |
| JP | 2021-196875 | A | 12/2021 |
| WO | 2021/186520 | A1 | 9/2021 |

OTHER PUBLICATIONS

International Search Report and Written Opinion mailed on Sep. 13, 2022, received for International Application No. PCT/JP2022/025214, filed on Jun. 24, 2022, 11 pages including English Translation.

* cited by examiner

CONVOY MANAGEMENT DEVICE AND CONVOY MANAGEMENT METHOD

CROSS-REFERENCE TO RELATED APPLICATION

This is a continuation application of PCT/JP2022/025214, filed on Jun. 24, 2022, the entire contents of which are incorporated herein by reference in their entirety.

TECHNICAL FIELD

The present disclosure relates to a convoy management device to manage a convoy formed by a plurality of vehicles.

BACKGROUND ART

There is a conventionally-known system to manage a convoy formed by a plurality of vehicles (e.g. see Patent Literature 1). The system disclosed in Patent Literature 1 makes it possible to perform control to change a convoy of vehicles according to the surrounding situation obtained with sensors provided to the vehicles.

CITATION LIST

Patent Literatures

Patent Literature 1: JP 2021-28748 A

SUMMARY OF INVENTION

Technical Problem

In this manner, the system disclosed in Patent Literature 1 changes a convoy formed by a plurality of vehicles according to the surrounding situation. However, this system does not grasp states of occupants riding the vehicles. Accordingly, the system cannot implement a change to an appropriate convoy according to the situation of the occupants.

The present disclosure has been made to solve the problem described above, and an object thereof is to provide a convoy management device that makes it possible to change a convoy formed by vehicles according to states of occupants riding the vehicles.

Solution to Problem

A convoy management device according to the present disclosure includes: processing circuitry to sense a plurality of convoy-management-target vehicles; to sense a behavior by an occupant riding a vehicle of the sensed plurality of convoy-management-target vehicles toward another occupant riding another vehicle of the plurality of convoy-management-target vehicles; to compute a convoy of the sensed plurality of convoy-management-target vehicles on the basis of a result of sensing the behavior; and to control the convoy of the sensed plurality of convoy-management-target vehicles on the basis of a result of the computation.

Advantageous Effects of Invention

Since the present disclosure adopts the configuration described above, the present disclosure makes it possible to change a convoy formed by vehicles according to states of occupants riding the vehicles.

DESCRIPTION OF EMBODIMENTS

Hereinbelow, an embodiment is explained in detail with reference to the figures.

First Embodiment

Figure 1:
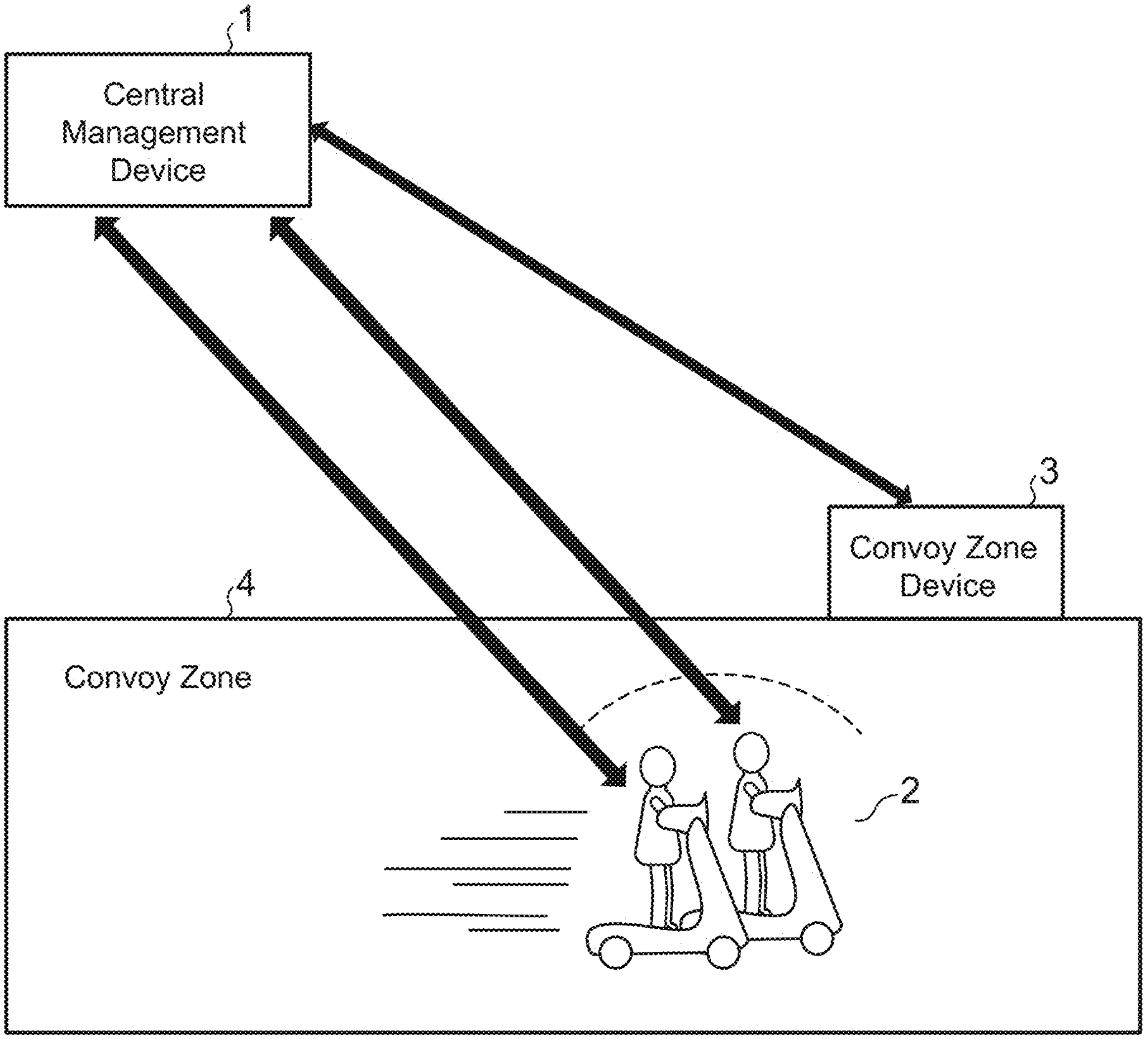
FIG. 1 is a figure depicting a configuration example of a convoy management system according to a first embodiment.

FIG. 1 is a figure depicting a configuration example of a convoy management system according to a first embodiment.

As depicted in FIG. 1, the convoy management system includes a central management device 1, a plurality of vehicles 2, and a convoy zone device 3. Note that whereas FIG. 1 depicts a case where there are two convoy-management-target vehicles 2, the number of vehicles 2 is not limited to this.

The central management device 1 manages a convoy formed by the plurality of convoy-management-target vehicles 2 in a convoy zone 4. That is, a convoy management device is applied to the central management device 1 in the case depicted here. Note that the convoy zone 4 is a zone where the plurality of convoy-management-target vehicles 2 can form a convoy.

Details of the central management device 1 are mentioned later.

The vehicles 2 are vehicles ridden by occupants, and are vehicles that can travel the convoy zone 4. The vehicles 2 are autonomously-travelable personal mobilities.

When a vehicle 2 ridden by an occupant travels the convoy zone 4, a convoy that the vehicle 2 forms with other vehicles 2 belonging to the same group is managed.

Figure 2:
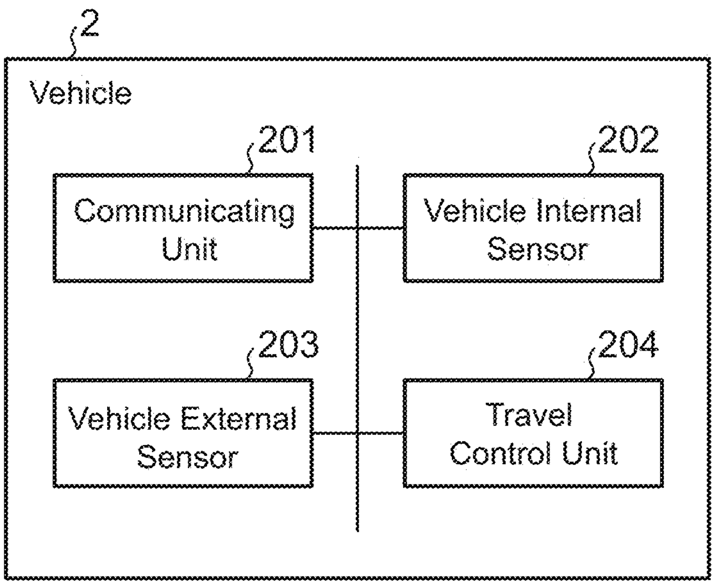
FIG. 2 is a figure depicting a configuration example of a vehicle according to the first embodiment.

As depicted in FIG. 2, each vehicle 2 includes a communicating unit 201, a vehicle internal sensor 202, a vehicle external sensor 203, and a travel control unit 204.

The communicating unit 201 exchanges information with a communicating unit 101 provided to the central management device 1.

The vehicle internal sensor 202 is a sensor that enables sensing of a state of an occupant who is inside the vehicle 2, that is, who is riding the vehicle 2. For example, one or more from among a camera sensor, a microphone, and the like are used as the vehicle internal sensor 202.

Data representing a result of the sensing by the vehicle internal sensor 202 is sent to the central management device 1 via the communicating unit 201 at least in a case where the vehicle 2 is in the convoy zone 4.

The vehicle external sensor 203 is a sensor that enables sensing of the situation around the vehicle 2. For example, one or more from among sensors like a camera sensor, a triaxial acceleration sensor, a position sensor, a LiDAR, a sonar, and the like are used as the vehicle external sensor 203.

Data representing a result of the sensing by the vehicle external sensor 203 is sent to the central management device 1 via the communicating unit 201 at least in a case where the vehicle 2 is in the convoy zone 4.

The travel control unit 204 controls traveling related to the convoy of the vehicles 2 according to control by the central management device 1 at least in a case where the vehicles 2 are in the convoy zone 4. That is, the travel control unit 204 controls the convoy formed with other vehicles 2 by controlling the travel route, advancing speed, and the like of the vehicle 2 according to the control described above.

Note that although traveling of the vehicle 2 related to a change of the convoy and the maintenance of the convoy is controlled by the central management device 1 as described above, traveling in other respects is controlled by the occupant.

The convoy zone device 3 is a device provided to the convoy zone 4.

Figure 3:
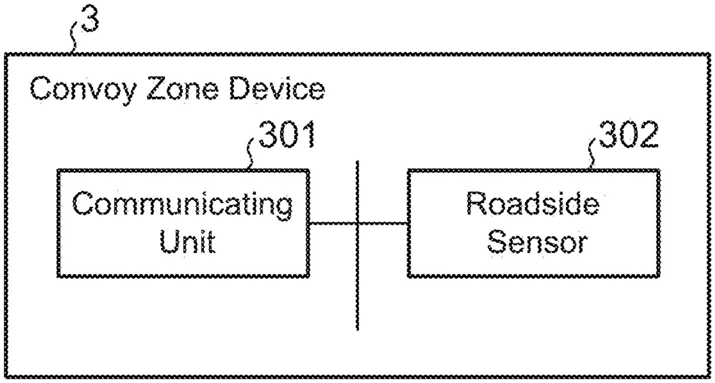
FIG. 3 is a figure depicting a configuration example of a convoy zone device according to the first embodiment.

As depicted in FIG. 3, the convoy zone device 3 includes a communicating unit 301 and a roadside sensor 302.

The communicating unit 301 exchanges information with the communicating unit 101 provided to the central management device 1.

The roadside sensor 302 is a sensor that enables sensing of the situation in the convoy zone 4. For example, one or more from among sensors like a camera sensor, a LiDAR, and the like are used as the roadside sensor 302. The one or more sensors as the roadside sensor 302 are provided to the convoy zone 4.

Data representing a result of the sensing by the roadside sensor 302 is sent to the central management device 1 via the communicating unit 301.

Next, a configuration example of the central management device 1 is explained.

Figure 4:
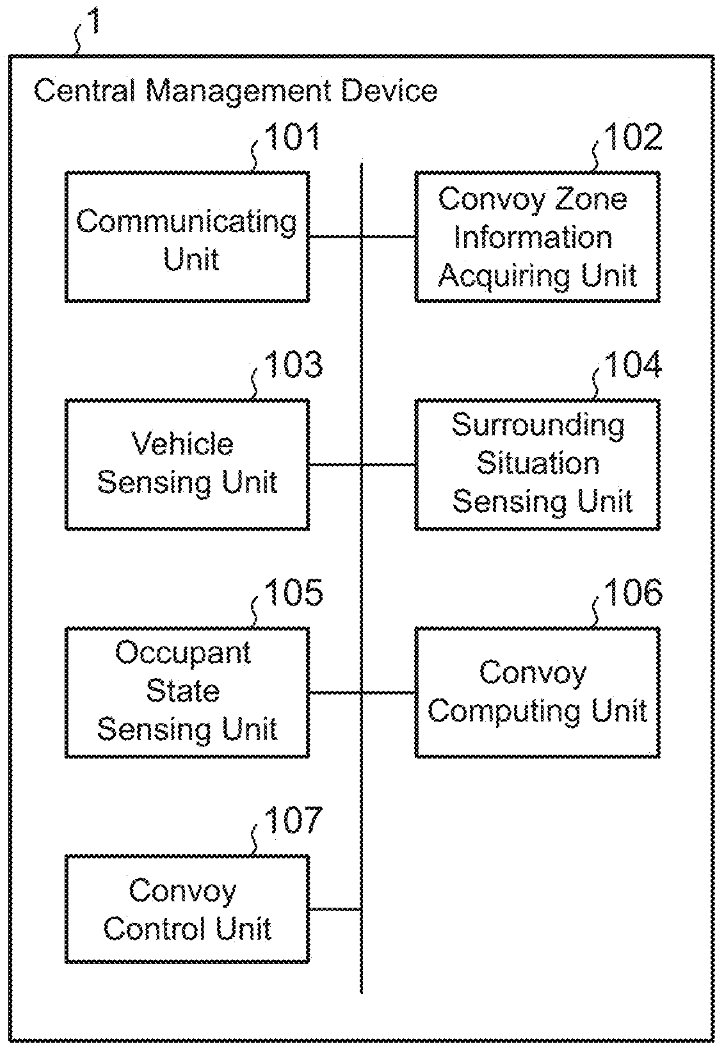
FIG. 4 is a figure depicting a configuration example of a central management device according to the first embodiment.

As depicted in FIG. 4, the central management device 1 includes the communicating unit 101, a convoy zone information acquiring unit 102, a vehicle sensing unit 103, a surrounding situation sensing unit 104, an occupant state sensing unit 105, a convoy computing unit 106, and a convoy control unit 107.

The communicating unit 101 exchanges information with the communicating units 201 provided to the vehicles 2, and the communicating unit 301 provided to the convoy zone device 3.

The convoy zone information acquiring unit 102 acquires information about the convoy zone 4. For example, the information about the convoy zone 4 includes map information representing the convoy zone 4, and information representing installation locations and sensing ranges of the roadside sensor 302 in the convoy zone 4.

Note that the map information representing the convoy zone 4 is not necessarily fixed map information, but map information representing the positions of moving objects such as humans or vehicles that are updated in real time can also be used as the map information.

The vehicle sensing unit 103 senses the plurality of convoy-management-target vehicles 2. At this time, for example, the vehicle sensing unit 103 performs the sensing described above on the basis of one or more from among a result of the sensing by the roadside sensor 302 provided to the convoy zone device 3, and results of the sensing by the vehicle external sensors 203 provided to the vehicles 2.

For example, the vehicle sensing unit 103 treats a plurality of vehicles 2 traveling together in a predetermined range in the convoy zone 4 as a plurality of vehicles 2 belonging to one group, and treats them as convoy management targets.

An existing technology can be applied as a technology for pairing of vehicles 2 by the vehicle sensing unit 103.

The surrounding situation sensing unit 104 senses the surrounding situation of the plurality of convoy-management-target vehicles 2 sensed by the vehicle sensing unit 103. At this time, the surrounding situation sensing unit 104 performs the sensing described above on the basis of one or more from among a result of the sensing by the roadside sensor 302 provided to the convoy zone device 3, and results of the sensing by the vehicle external sensors 203 provided to the plurality of convoy-management-target vehicles 2. Note that it is desirable if the surrounding situation sensing unit 104 performs the sensing described above in real time at least while the plurality of convoy-management-target vehicles 2 are in the convoy zone 4.

The occupant state sensing unit 105 senses states of occupants riding the plurality of convoy-management-target vehicles 2 sensed by the vehicle sensing unit 103. At this time, the surrounding situation sensing unit 104 performs the sensing described above on the basis of one or more from among a result of the sensing by the roadside sensor 302 provided to the convoy zone device 3, and results of the sensing by the vehicle internal sensors 202 provided to the plurality of convoy-management-target vehicles 2.

Note that, for example, examples of the states of the occupants described above include states related to conversations of the occupants, states related to facial expressions of the occupants, states related to postures of the occupants, and the like. For example, examples of the states related to conversations of the occupants include whether or not a conversation has started, whether or not a conversation has ended, the speed or volume of a conversation, a change of the speed or volume of a conversation, and the like. For example, examples of the states related to facial expressions of the occupants include the position or angle of the tail of an eye, the position or angle of a corner of a mouth, a change of any of these, and the like. For example, examples of the states related to postures of the occupants include whether or not the body of an occupant is inclined to be closer to another occupant, whether or not the body of an occupant is inclined to be farther away from another occupant, the orientation of an occupant, and the like.

In addition, it is desirable if the occupant state sensing unit 105 performs the sensing described above in real time at least while the plurality of convoy-management-target vehicles 2 are in the convoy zone 4.

The convoy computing unit 106 computes the convoy of the plurality of convoy-management-target vehicles 2 sensed by the vehicle sensing unit 103 on the basis of a result of the sensing by the surrounding situation sensing unit 104, and a result of the sensing by the occupant state sensing unit 105. That is, the convoy computing unit 106 computes a formation and inter-distance of the convoy of the plurality of convoy-management-target vehicles 2 on the basis of the sensing results described above. At this time, the convoy computing unit 106 performs the computation described above with reference to a result of the acquisition by the convoy zone information acquiring unit 102. In addition, the convoy computing unit 106 performs the computation described above dynamically.

In addition, in addition to what has been described above, the convoy computing unit 106 may compute the speeds of the plurality of convoy-management-target vehicles 2 on the basis of the sensing results described above.

The convoy control unit 107 controls the convoy of the plurality of convoy-management-target vehicles 2 sensed by the vehicle sensing unit 103 on the basis of a result of the computation by the convoy computing unit 106.

Note that FIG. 4 depicts a case where the surrounding situation sensing unit 104 is provided to the central management device 1. However, the surrounding situation sensing unit 104 is not an essential component of the central management device 1, and therefore may not be provided to the central management device 1.

Next, an example of an operation performed by the central management device 1 according to the first embodiment depicted in FIG. 4 is explained with reference to FIG. 5.

Note that the convoy zone information acquiring unit 102 has acquired the information about the convoy zone 4. For example, the information about the convoy zone 4 includes map information representing the convoy zone 4, and information representing installation locations and sensing ranges of the roadside sensor 302 in the convoy zone 4.

Figure 5:
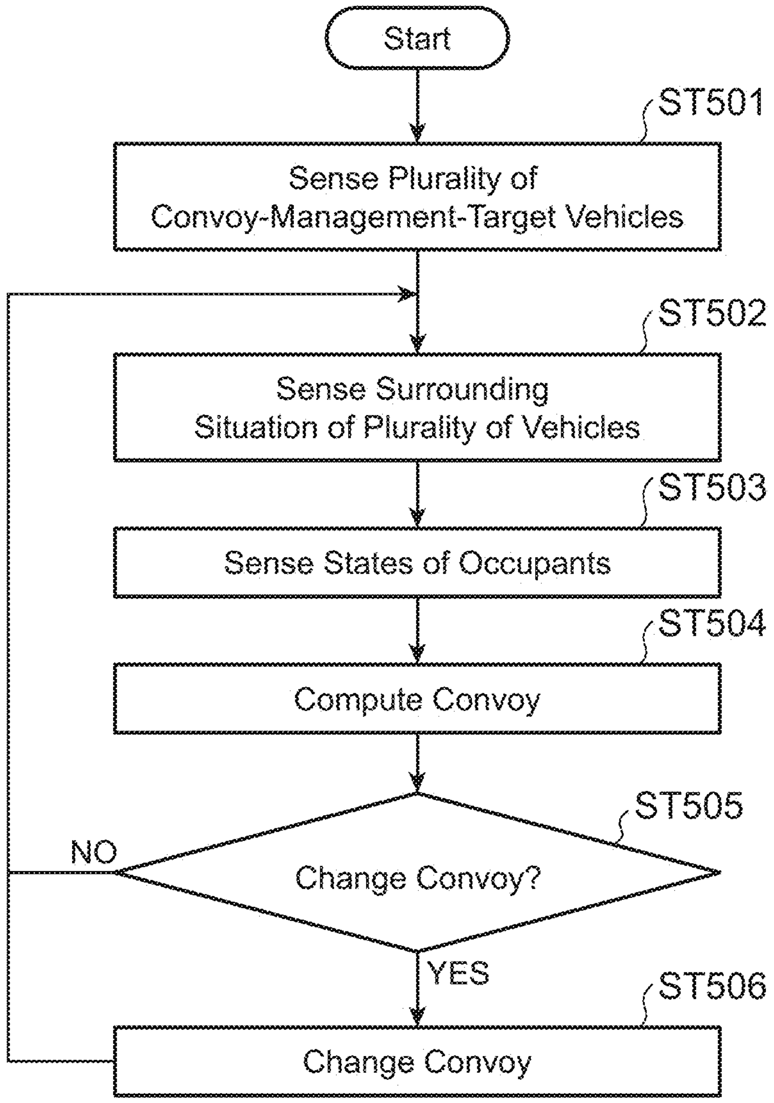
FIG. 5 is a flowchart depicting an example of an operation performed by the central management device according to the first embodiment.

In the example of the operation performed by the central management device 1 according to the first embodiment depicted in FIG. 4, as depicted in FIG. 5, first, the vehicle sensing unit 103 senses a plurality of convoy-management-target vehicles 2 (Step ST501). At this time, for example, the vehicle sensing unit 103 performs the sensing described above on the basis of one or more from among a result of the sensing by the roadside sensor 302 provided to the convoy zone device 3, and results of the sensing by the vehicle external sensors 203 provided to the vehicles 2.

For example, the vehicle sensing unit 103 treats a plurality of vehicles 2 traveling together in a predetermined range in the convoy zone 4 as a plurality of vehicles 2 belonging to one group, and treats them as convoy management targets.

Next, the surrounding situation sensing unit 104 senses the surrounding situation of the plurality of convoy-management-target vehicles 2 sensed by the vehicle sensing unit 103 (Step ST502). At this time, the surrounding situation sensing unit 104 performs the sensing described above on the basis of one or more from among a result of the sensing by the roadside sensor 302 provided to the convoy zone device 3, and results of the sensing by the vehicle external sensors 203 provided to the plurality of convoy-management-target vehicles 2. Note that it is desirable if the surrounding situation sensing unit 104 performs the sensing described above in real time at least while the plurality of convoy-management-target vehicles 2 are in the convoy zone 4.

Note that by using a result of the sensing by the roadside sensor 302 at the surrounding situation sensing unit 104, it is possible to perform sensing also of an area which is a blind spot from the vehicle external sensor 203 in contrast to a case where only results of the sensing by the vehicle external sensors 203 are used. In this case, it becomes possible for the surrounding situation sensing unit 104 to perform sensing of the surrounding situation more precisely.

In addition, the occupant state sensing unit 105 senses the states of occupants riding the plurality of convoy-management-target vehicles 2 sensed by the vehicle sensing unit 103 (Step ST503). At this time, the surrounding situation sensing unit 104 performs the sensing described above on the basis of one or more from among a result of the sensing by the roadside sensor 302 provided to the convoy zone device 3, and results of the sensing by the vehicle internal sensors 202 provided to the plurality of convoy-management-target vehicles 2. In addition, it is desirable if the occupant state sensing unit 105 performs the sensing described above in real time at least while the plurality of convoy-management-target vehicles 2 are in the convoy zone 4.

Note that by using a result of the sensing by the roadside sensor 302 at the occupant state sensing unit 105, it becomes possible to more rightly sense the overall state of the occupants riding the plurality of convoy-management-target vehicles 2 in contrast to a case where only results of the sensing by the vehicle internal sensors 202 are used. In this case, it becomes possible for the downstream convoy computing unit 106 to perform the convoy computation more precisely.

Next, the convoy computing unit 106 computes the convoy of the plurality of convoy-management-target vehicles 2 sensed by the vehicle sensing unit 103 on the basis of a result of the sensing by the surrounding situation sensing unit 104, and a result of the sensing by the occupant state sensing unit 105 (Step ST504). That is, the convoy computing unit 106 computes a formation and inter-distance of the convoy of the plurality of convoy-management-target vehicles 2 on the basis of the sensing results described above. At this time, the convoy computing unit 106 performs the computation described above with reference to a result of the acquisition by the convoy zone information acquiring unit 102. In addition, the convoy computing unit 106 performs the computation described above dynamically.

For example, in a case where the occupant state sensing unit 105 senses that occupants have started a conversation, the convoy computing unit 106 computes such a convoy that vehicles 2 ridden by the occupants come next to each other. In addition, at this time, in a case where the occupant state sensing unit 105 senses that three or more occupants have started a conversation, the convoy computing unit 106 may compute such a convoy that vehicles 2 ridden by the occupants form a polygon. In addition, for example, in a case where the occupant state sensing unit 105 senses that occupants have started a conversation, the convoy computing unit 106 may compute such a convoy that vehicles 2 ridden by the occupants face each other.

On the other hand, for example, in a case where the occupant state sensing unit 105 senses that occupants have ended a conversation, the convoy computing unit 106 computes such a convoy that vehicles 2 ridden by the occupants form a line.

In addition, for example, according to the volume of a conversation of occupants sensed by the occupant state sensing unit 105, the convoy computing unit 106 may change the distance between vehicles 2 ridden by the occupants. For example, because in a case where the volume of the conversation of the occupants is large it is thought that the distance between the vehicles 2 ridden by the occupants is long or the occupants are having a lively conversation, in such a case, the convoy computing unit 106 may compute such a convoy that the distance between the vehicles 2 is reduced.

In addition, for example, in a case where the occupant state sensing unit 105 senses that an occupant is at such a posture that her/his body is brought closer to a second occupant, the convoy computing unit 106 computes such a convoy that a vehicle 2 ridden by the occupant who has brought her/his body closer is brought closer to a vehicle 2 ridden by the second occupant.

On the other hand, for example, in a case where the occupant state sensing unit 105 senses that an occupant is at such a posture that her/his body is brought farther away from a second occupant, the convoy computing unit 106 computes such a convoy that a vehicle 2 ridden by the occupant who has brought her/his body farther away is brought farther away from a vehicle 2 ridden by the second occupant.

In addition, for example, in a case where the occupant state sensing unit 105 senses that an occupant is smiling, the convoy computing unit 106 computes such a convoy that a vehicle 2 ridden by the occupant is brought closer to another vehicle 2.

On the other hand, for example, in a case where the occupant state sensing unit 105 senses that an occupant has a displeased look, the convoy computing unit 106 computes such a convoy that a vehicle 2 ridden by the occupant is brought farther away from another vehicle 2.

In this manner, for example, the convoy computing unit 106 takes into consideration conversations, postures, or the like of the occupants riding the plurality of convoy-management-target vehicles 2 on the basis of a result of the sensing by the occupant state sensing unit 105. For example, in a case where it is sensed that occupants are wishing to have a conversation, in a case where it is sensed that occupants are having a lively conversation, or in other cases, such a convoy that occupants are brought closer to each other is computed.

Note that, at this time, for example, the convoy computing unit 106 computes the convoy described above taking into consideration the situation about a road width, the situation about congestion, or the like sensed by the surrounding situation sensing unit 104.

For example, in a case where the surrounding situation sensing unit 104 senses that the road width of a road ahead of the plurality of convoy-management-target vehicles 2 becomes narrow, in a case where it is sensed that there is an obstacle on the road ahead, in a case where the surrounding situation sensing unit 104 senses that a following vehicle is approaching the plurality of convoy-management-target vehicles 2, or in other cases, the convoy computing unit 106 computes such a convoy that the plurality of convoy-management-target vehicles 2 form a line.

Note that it is desirable if the convoy computing unit 106 basically computes the convoy described above prioritizing the surrounding situation sensed by the surrounding situation sensing unit 104 over the states of the occupants sensed by the occupant state sensing unit 105.

In addition, the convoy computing unit 106 may make the degree of the inter-distance of the plurality of convoy-management-target vehicles 2 adjustable according to an instruction from an occupant via an input unit which is not depicted. That is, the convoy computing unit 106 may compute a convoy in a wide range in a case where the convoy computing unit 106 receives an instruction from an occupant for increasing the inter-distance. On the other hand, the convoy computing unit 106 may compute a convoy in a narrow range in a case where the convoy computing unit 106 receives an instruction from an occupant for reducing the inter-distance.

In addition, the convoy computing unit 106 may compute the speeds of the plurality of convoy-management-target vehicles 2 on the basis of the sensing results described above.

For example, in a case where the occupant state sensing unit 105 senses that occupants are too busy having a conversation, the convoy computing unit 106 computes such a convoy that the advancing speeds of the vehicles 2 ridden by the occupants are decreased from the current speeds.

On the other hand, for example, in a case where the occupant state sensing unit 105 senses that occupants are not having a conversation, the convoy computing unit 106 computes such a convoy that the advancing speeds of the vehicles 2 ridden by the occupants are increased from the current speeds.

Figure 6:
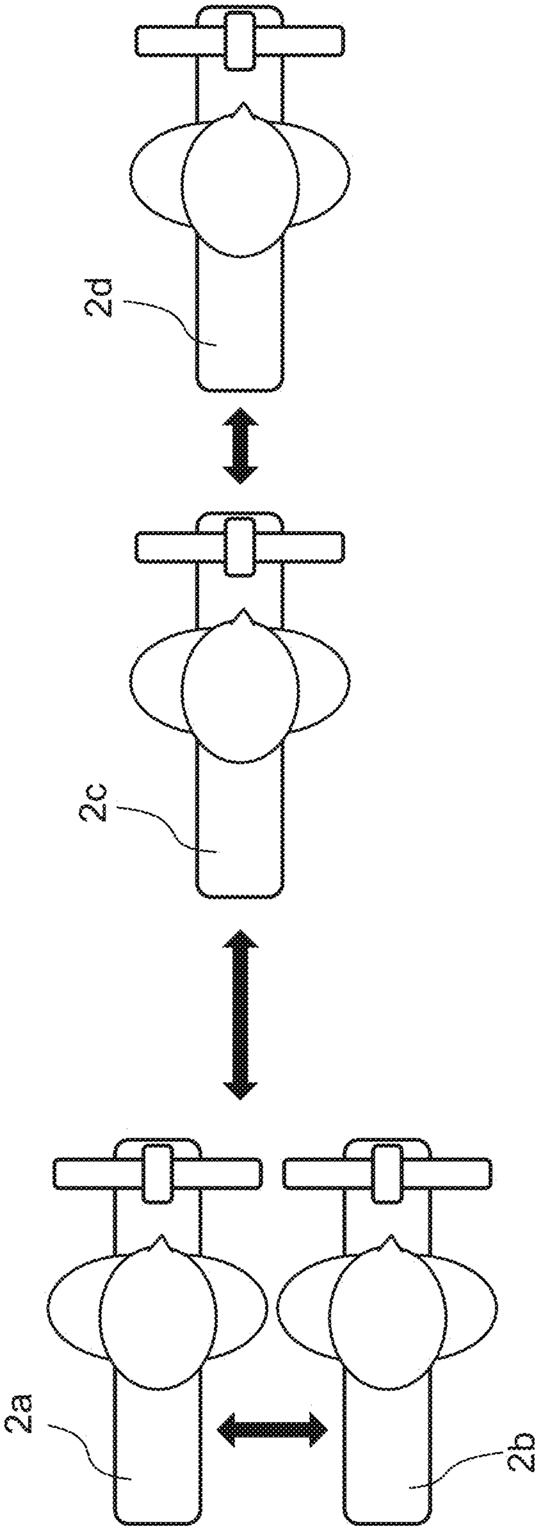
FIG. 6 is a figure depicting an example of an operation performed by the central management device according to the first embodiment.

FIG. 6 depicts a case where a plurality of convoy-management-target vehicles 2 are four vehicles 2 (vehicles 2*a* to 2*d*). In this case, the convoy computing unit 106 computes a formation of a convoy of these vehicles 2*a* to 2*d*, and the distances between the vehicles 2*a* to 2*d*. Note that arrows in FIG. 6 represent the distances between the vehicles 2*a* to 2*d*.

In addition, in FIG. 6, in addition to what has been described above, the convoy computing unit 106 may compute speeds of the vehicles 2*a* to 2*d*.

Next, the convoy control unit 107 determines whether it is necessary to change the convoy of the plurality of convoy-management-target vehicles 2 sensed by the vehicle sensing unit 103 on the basis of a result of the computation by the convoy computing unit 106 (Step ST505). That is, the convoy control unit 107 determines whether the convoy computed by the convoy computing unit 106 has changed from the current convoy of the plurality of convoy-management-target vehicles 2.

In a case where it is determined at Step ST505 that the convoy control unit 107 need not to change the convoy of the plurality of convoy-management-target vehicles 2 sensed by the vehicle sensing unit 103, the sequence returns to Step ST502, and the operation described above is repeated.

On the other hand, in a case where it is determined at Step ST505 that the convoy control unit 107 needs to change the convoy of the plurality of convoy-management-target vehicles 2 sensed by the vehicle sensing unit 103, the convoy control unit 107 changes the convoy of the plurality of convoy-management-target vehicles 2 on the basis of a result of the computation by the convoy computing unit 106 (Step ST506).

Thereafter, the sequence returns to Step ST501, and the operation described above is repeated.

In this manner, the central management device 1 according to the first embodiment senses the states of occupants, computes a convoy in the convoy zone 4 on the basis of the states of the occupants, and controls the convoy. Thereby, the central management device 1 according to the first embodiment makes it possible to implement more appropriate convoy control taking into consideration the states of occupants as compared to conventional technologies.

Furthermore, the central management device 1 according to the first embodiment computes a convoy in the convoy zone 4 on the basis also of the surrounding situation of the convoy zone 4 in addition to the states of the occupants, and controls the convoy. Thereby, the central management device 1 according to the first embodiment makes it possible to implement more appropriate convoy control.

Note that, for example, the system disclosed in Patent Literature 1 changes a convoy formed by a plurality of vehicles according to the surrounding situation. However, this system does not grasp states of occupants riding the vehicles. Accordingly, the system does not achieve an appropriate convoy according to the situation of the occupants.

In contrast to this, the central management device 1 according to the first embodiment can always perform optimum convoy control according to the situation of occupants. As a result, the central management device 1 according to the first embodiment makes it possible to smoothly and flexibly control an optimum convoy taking into consideration the intension and situation of inter-personal communication between occupants as compared to conventional technologies.

Note that the description above depicts a case where the convoy management device is applied to the central management device 1 which is a device different from vehicles 2. However, this is not the sole example, but the convoy management device may be applied to a vehicle 2.

In addition, the description above depicts a case where all components of the convoy management device are applied to one device. However, this is not the sole example, but the components of the convoy management device may be separately applied to two or more devices from among the central management device 1 and vehicles 2.

As mentioned above, according to the first embodiment, the convoy management device includes: the vehicle sensing unit 103 to sense a plurality of convoy-management-target vehicles 2; the occupant state sensing unit 105 to sense states of occupants riding the plurality of convoy-management-target vehicles 2 sensed by the vehicle sensing unit 103; the convoy computing unit 106 to compute a convoy of the plurality of convoy-management-target vehicles 2 sensed by the vehicle sensing unit 103 on the basis of a result of the sensing by the occupant state sensing unit 105; and the convoy control unit 107 to control the convoy of the plurality of convoy-management-target vehicles 2 sensed by the vehicle sensing unit 103 on the basis of a result of the computation by the convoy computing unit 106. Thereby, it becomes possible for the convoy management device according to the first embodiment to change the convoy formed by the vehicles 2 according to the states of the occupants riding the vehicles 2.

Figure 7A:
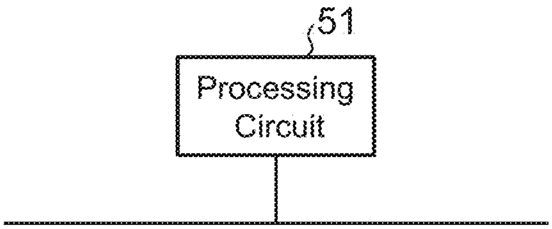
FIG. 7A and FIG. 7B are figures depicting hardware configuration examples of the central management device according to the first embodiment.
Figure 7B:
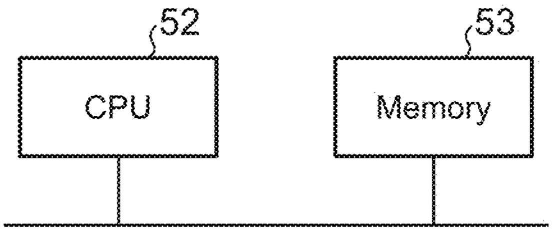

Last, a hardware configuration example of the central management device 1 according to the first embodiment is explained with reference to FIGS. 7A and 7B.

Respective functions of the communicating unit 101, the convoy zone information acquiring unit 102, the vehicle sensing unit 103, the surrounding situation sensing unit 104, the occupant state sensing unit 105, the convoy computing unit 106, and the convoy control unit 107 of the central management device 1 are implemented by a processing circuit 51. The processing circuit 51 may be dedicated hardware as depicted in FIG. 7A, or, as depicted in FIG. 7B, may be a Central Processing Unit (CPU; also referred to as a central processing unit, a processing device, an arithmetic operation device, a microprocessor, a microcomputer, a processor, or a Digital Signal Processor (DSP)) 52 to execute programs stored on a memory 53.

In a case where the processing circuit 51 is dedicated hardware, for example, the processing circuit 51 is equivalent to a single circuit, a composite circuit, a programmed processor, a parallel-programmed processor, an Application Specific Integrated Circuit (ASIC), a Field Programmable Gate Array (FPGA), or a combination of these. The function of each unit of the communicating unit 101, the convoy zone information acquiring unit 102, the vehicle sensing unit 103, the surrounding situation sensing unit 104, the occupant state sensing unit 105, the convoy computing unit 106, and the convoy control unit 107 may be implemented by the processing circuit 51, or the function of each unit may be implemented collectively by the processing circuit 51.

In a case where the processing circuit 51 is the CPU 52, the functions of the communicating unit 101, the convoy zone information acquiring unit 102, the vehicle sensing unit 103, the surrounding situation sensing unit 104, the occupant state sensing unit 105, the convoy computing unit 106, and the convoy control unit 107 are implemented by software, firmware, or a combination of software and firmware. The software and the firmware are written as programs, and stored on the memory 53. The processing circuit 51 implements the function of each unit by reading out and executing the programs stored on the memory 53. That is, the central management device 1 includes the memory 53 for storing the programs, execution of which by the processing circuit 51 results in execution of each step depicted in FIG. 5, for example. In addition, these programs can also be said to be ones that cause a computer to execute procedures and methods performed by the communicating unit 101, the convoy zone information acquiring unit 102, the vehicle sensing unit 103, the surrounding situation sensing unit 104, the occupant state sensing unit 105, the convoy computing unit 106, and the convoy control unit 107. Here, for example, the memory 53 is equivalent to a non-volatile or volatile semiconductor memory such as a Random Access Memory (RAM), a Read Only Memory (ROM), a flash memory, an Erasable Programmable ROM (EPROM), or an Electrically EPROM (EEPROM), a magnetic disk, a flexible disc, an optical disc, a compact disc, a mini disc, a Digital Versatile Disc (DVD), or the like.

Note that some of the respective functions of the communicating unit 101, the convoy zone information acquiring unit 102, the vehicle sensing unit 103, the surrounding situation sensing unit 104, the occupant state sensing unit 105, the convoy computing unit 106, and the convoy control unit 107 may be implemented by dedicated hardware, and some of them may be implemented by software or firmware. For example, the function of the communicating unit 101 can be implemented at the processing circuit 51 as dedicated hardware, and the functions of the convoy zone information acquiring unit 102, the vehicle sensing unit 103, the surrounding situation sensing unit 104, the occupant state sensing unit 105, the convoy computing unit 106, and the convoy control unit 107 can be implemented by the processing circuit 51 reading out and executing programs stored on the memory 53.

In this manner, the processing circuit 51 can implement respective functions mentioned above by hardware, software, firmware, or a combination of these.

Note that modification of any component of the embodiment, or omission of any component of the embodiment is possible.

INDUSTRIAL APPLICABILITY

The convoy management device according to the present disclosure makes it possible to change a convoy formed by vehicles according to states of occupants riding the vehicles, and is suited for being used for a convoy management device that manages a convoy formed by a plurality of vehicles, or the like.

REFERENCE SIGNS LIST

1: central management device, 2: vehicle, 3: convoy zone device, 4: convoy zone, 51: processing circuit, 52: CPU, 53: memory, 101: communicating unit, 102: convoy zone information acquiring unit, 103: vehicle sensing unit, 104: surrounding situation sensing unit, 105: occupant state sensing unit, 106: convoy computing unit, 107: convoy control unit, 201: communicating unit, 202: vehicle internal sensor, 203: vehicle external sensor, 204: travel control unit, 301: communicating unit, 302: roadside sensor

The invention claimed is:

1. A convoy management device comprising:

processing circuitry to sense a plurality of convoy-management-target vehicles;

to sense, in real-time using one or more vehicle internal sensors provided to the plurality of convoy-management-target vehicles, a behavior by an occupant riding a vehicle of the sensed plurality of convoy-management-target vehicles toward another occupant riding another vehicle of the plurality of convoy-management-target vehicles;

to compute a convoy formation and inter-distance of the sensed plurality of convoy-management-target vehicles on a basis of a result of sensing the behavior; and to control autonomous travel routes and speeds of the convoy of the sensed plurality of convoy-management-target vehicles on a basis of a result of the computation to adjust the convoy formation and inter-distance.

2. The convoy management device according to claim 1, the processing circuitry is further configured to sense a situation around the sensed plurality of convoy-management-target vehicles, wherein the processing circuitry computes the convoy of the sensed plurality of convoy-management-target vehicles on a basis of the result of sensing the behavior and a result of sensing the situation.

3. The convoy management device according to claim 2, wherein the processing circuitry is further configured to sense the situation around the sensed plurality of convoy-management-target vehicles using one or more roadside sensors provided to a convoy zone, the one or more roadside sensors including at least one of a camera sensor or a LiDAR.

4. The convoy management device according to claim 2, wherein the processing circuitry computes the convoy formation and inter-distance based further on avoiding an obstacle in the sensed situation around the sensed plurality of convoy-management-target vehicles.

5. The convoy management device according to claim 1, wherein the plurality of convoy-management-target vehicles are autonomously-travelable personal mobilities.

6. The convoy management device according to claim 1, wherein the processing circuitry is further configured to sense the plurality of convoy-management-target vehicles using one or more vehicle external sensors provided to the plurality of convoy-management-target vehicles, the one or more vehicle external sensors including at least one of a camera sensor, a triaxial acceleration sensor, a position sensor, a LiDAR, or a sonar.

7. The convoy management device according to claim 1, wherein the sensed behavior includes a state related to a conversation between the occupant and the another occupant, the state including at least one of whether the conversation has started, whether the conversation has ended, a speed of the conversation, a volume of the conversation, or a change in the speed or the volume of the conversation.

8. The convoy management device according to claim 1, wherein the sensed behavior includes a state related to a facial expression of the occupant, the state including at least one of a position or angle of a tail of an eye of the occupant, a position or angle of a corner of a mouth of the occupant, or a change in the position or angle of the tail of the eye or the corner of the mouth.

9. The convoy management device according to claim 1, wherein the sensed behavior includes a state related to a posture of the occupant, the state including at least one of whether a body of the occupant is inclined to be closer to the another occupant, whether the body of the occupant is inclined to be farther away from the another occupant, or an orientation of the occupant.

10. The convoy management device according to claim 1, wherein the processing circuitry computes the convoy formation and inter-distance to bring the vehicle and the another vehicle closer together in response to the sensed behavior indicating a positive interaction between the occupant and the another occupant.

11. The convoy management device according to claim 1, wherein the processing circuitry computes the convoy formation and inter-distance to separate the vehicle and the another vehicle in response to the sensed behavior indicating a negative interaction between the occupant and the another occupant.

12. The convoy management device according to claim 1, wherein the convoy formation includes a side-by-side formation or a front-back formation.

13. The convoy management device according to claim 1, wherein the processing circuitry is further configured to acquire information about a convoy zone in which the plurality of convoy-management-target vehicles form the convoy, the information including map information representing the convoy zone.

14. The convoy management device according to claim 13, wherein the information about the convoy zone further includes information representing installation locations and sensing ranges of one or more roadside sensors in the convoy zone.

15. The convoy management device according to claim 1, wherein the processing circuitry senses the plurality of convoy-management-target vehicles by treating a plurality of vehicles traveling together in a predetermined range in a convoy zone as belonging to one group.

16. The convoy management device according to claim 1, wherein the convoy management device is a central management device separate from the plurality of convoy-management-target vehicles.

17. The convoy management device according to claim 1, wherein the processing circuitry controls the autonomous travel routes and speeds by sending instructions to travel control units provided to the plurality of convoy-management-target vehicles.

18. A convoy management method comprising:

sensing a plurality of convoy-management-target vehicles;

sensing, in real-time using one or more vehicle internal sensors provided to the plurality of convoy-management-target vehicles, a behavior by an occupant riding a vehicle of the sensed plurality of convoy-management-target vehicles toward another occupant riding another vehicle of the plurality of convoy-management-target vehicles;

computing a convoy formation and inter-distance of the sensed plurality of convoy-management-target vehicles on a basis of a result of sensing the behavior; and controlling autonomous travel routes and speeds of the convoy of the sensed plurality of convoy-management-target vehicles on a basis of a result of the computation to adjust the convoy formation and inter-distance.

* * * * *